Aug. 13, 1968　　M. HASTEN ET AL　　3,396,676
EXTRUSION APPARATUS

Filed May 2, 1966　　2 Sheets-Sheet 1

INVENTORS
MARK HASTEN
FLOYD LOBASH
DENNIS L. POMMER
BY
L. McKay Lillehaugen
ATTORNEY

INVENTORS
MARK HASTEN
FLOYD LOBASH
DENNIS L. POMMER
BY
ATTORNEY

United States Patent Office 3,396,676
Patented Aug. 13, 1968

3,396,676
EXTRUSION APPARATUS
Mark Hasten, Floyd Lobash, and Dennis L. Pommer, Minneapolis, Minn., assignors to General Mills, Inc., a corporation of Delaware
Filed May 2, 1966, Ser. No. 546,710
9 Claims. (Cl. 107—14)

ABSTRACT OF THE DISCLOSURE

An apparatus for forming an extruder tubular product having a uniform wall thickness. A mandrel or die insert is mounted within a die chamber so that one end projects into an extrusion orifice in the die chamber thereby forming an annular passage. The projecting end of the mandrel is eccentrically positioned within the orifice, and adjusting means are provided for laterally moving the eccentrically positioned projecting end with respect to the orifice, thereby concentrically positioning it within the orifice.

---

The present invention relates to an extrusion apparatus, and more particularly to an apparatus for forming a tubular product by forcing a plasticized dough material through an extrusion die. The apparatus is provided with improved means for controlling the uniformity of the wall thickness of the product.

According to the prior art, tubular products can be formed by forcing plasticized material through an extrusion die having a mandrel or core pin disposed therein in such a manner that an annular passage is formed at the discharge end of the extruder. It has been found that it is often quite difficult to produce a tubular product in this manner having the optimum characteristics as to its wall thickness and strength, even if the die itself is almost geometrically perfect. One factor which affects the uniformity of extruded products concerns temperature gradients which exists in the metal, as well as in the material being extruded. In other words, as the temperature of the material within the extrusion apparatus changes, its viscosity changes as well; as a result, the flow rate of the material changes. Differences in the flow rate result in extruded products which do not always have the desired characteristics. By adjusting the dimension of the annular space, the flow rate difference can be corrected so that a desired shape is obtained.

Various devices have been provided for controlling the relative spacing between the mandrel and the die. Most common are adjusting devices which move the die relative to the mandrel, or the mandrel relative to the die. According to the known prior art, a plurality of adjusting screws are spaced around the die and the mandrel and the relative spacing is controlled by adjusting these screws. It has been found however that devices of this type are not always satisfactory and certain disadvantages result with their use.

Accordingly, one object of this invention is to provide an improved extrusion apparatus for forming tubular products.

Another object is to provide an extrusion die apparatus for forming tubular products having a uniform wall thickness.

Still another object is to provide an improved extrusion apparatus for extruding tubular products wherein its wall thickness and strength can be controlled during the extrusion process.

A still further object is to provide a tubular product forming extrusion apparatus having an improved adjusting mechanism for controlling the relative wall thickness of the tubular product produced, during operation of the apparatus.

Another object is to provide an adjusting mechanism for an extrusion apparatus which is positioned on one side of the apparatus.

Other objects and advantages of the invention will become apparent from a consideration of the following specification and accompanying drawings. Before proceeding with a detailed description of the invention however, a short description of it will be presented.

Briefly, the extrusion apparatus includes a die chamber or casing having an extrusion orifice through which plasticized material can be forced. An elongate mandrel or core pin is mounted within the chamber in such a manner that one of its ends projects into the orifice, thereby forming an annular passage. The projecting end of the mandrel is eccentrically positioned within the orifice, and an adjusting mechanism positioned on one side of the apparatus is provided for controlling the relative spacing between the projecting end of the mandrel and the orifice.

The invention will best be understood by reference to the following drawings wherein.

Figure 1:
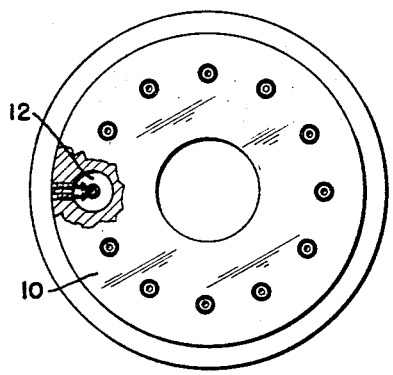
FIGURE 1 is an end view, in partial section, of an extrusion head provided with a number of extrusion dies.

FIGURE 1 illustrates an end view of an extrusion head 10, provided with a plurality of die assemblies designated generally by reference numeral 12, which are spaced around the edge of the apparatus. As viewed in FIG. 2, the extrusion apparatus includes a first or top die plate 14 and a second or bottom die plate 16 secured together by appropriate means such as bolts 18.

Figure 2:
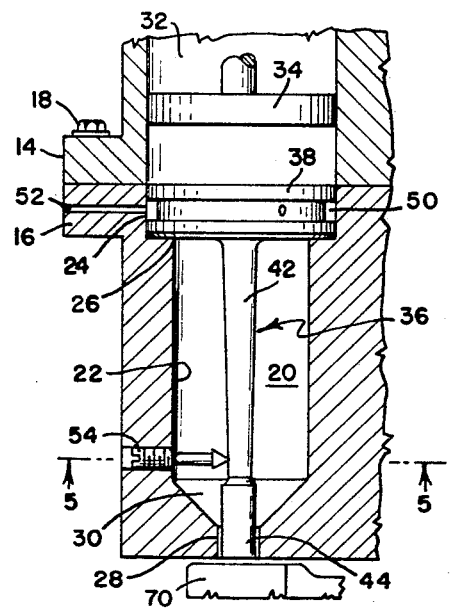
FIG. 2 is an elevational view in section showing the extrusion apparatus or die assembly.
Figure 4:
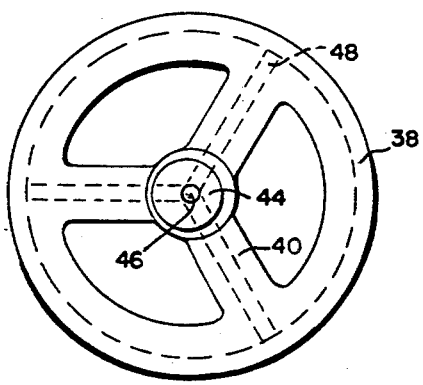
FIG. 4 is an end view taken along line 4—4 of FIG. 3.

FIGURE 2 depicts the extrusion apparatus, and more particularly the die assembly 12 in greater detail. The die plate 16 is provided with a number of chambers 20 which are formed in four portions; a first cylindrical bore 22 which defines an extruding chamber; a second cylindrical bore 24 which forms a shoulder 26 with the first bore 22; a third cylindrical bore 28 which defines an extrusion orifice in the surface of the die plate 16; and a frusto-conical portion 30 which connects the bores 22 and 28 together and defines a transition passage. As noted, the conical portion 30 tapers from the bore 22 toward the bore 28. The die plate 14 is provided with a plurality of bores 32, which correspond in size with the bores 24. When the die plates are secured together in the manner shown, the bores 24 and 32 are in alignment with each other. A piston 34 is movably mounted within the bore 32.

Figure 3:
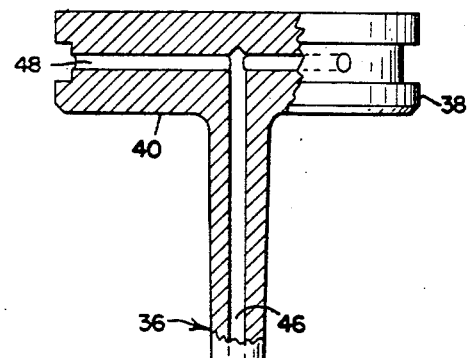
FIG. 3 is an enlarged plan view illustrating the die mandrel or core pin.

A die insert or mandrel 36 is mounted within the chamber 20 and it includes a mounting ring member 38, spokes or arms 40, and an elongate stem 42 which is connected to the ring member 38 by means of the arms 40. An end piece 44 is secured to or forms an integral part of the projecting end of the stem 42. As shown more clearly in FIG. 3, the end piece 44 is secured to or formed so that it is eccentrically positioned relative to the longitudinal axis of the stem 42. The mandrel 36 is press fit within the bore 24 in such a manner that the stem 42 projects toward the extrusion orifice, and the end piece 44 is eccentrically positioned within the bore 28; in this regard note FIG. 6. As noted in FIGS. 2 and 6, the end piece 44 is smaller than the bore 28 so that an annular passage is formed.

The stem 42 and the end piece 44 are provided with an axially aligned center air passage 46 which opens to the atmosphere at the discharge end of the mandrel 36. As its opposite end, the passage leads into each of three passages 48 formed in the spokes 40. The passages 48 in turn communicate with a peripheral groove 50 formed in the mounting ring 38. As shown in FIG. 2, a passage 52 is formed in the die plate 16, and it communicates with the passage formed between the mandrel 36 and the die plate 16. Means, not shown in the drawings, can be provided for providing a source of air flow into the passages.

If desired, a cutting mechanism 70 can be provided for slicing the tubular product as it is extruded through the extrusion orifice.

Figure 5:
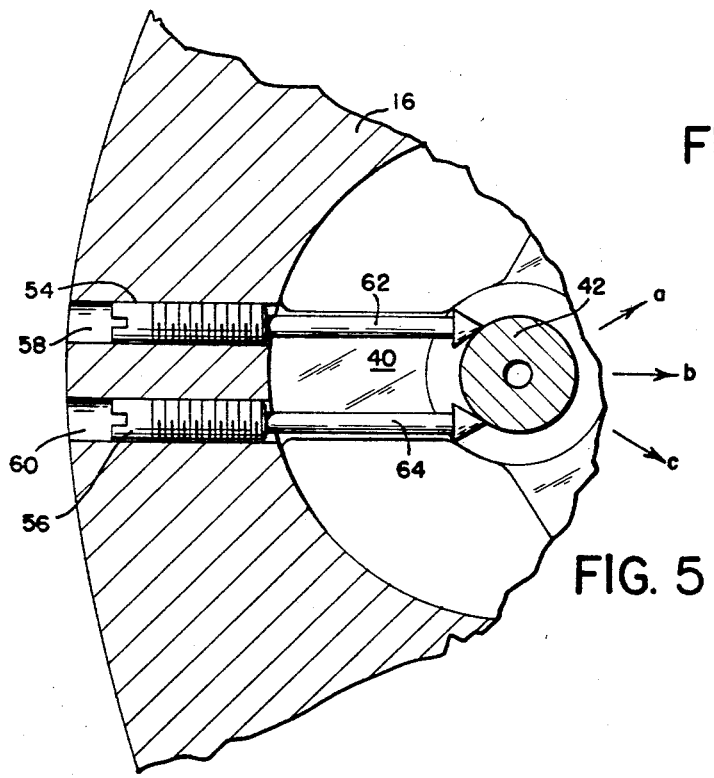
FIG. 5 is an enlarged partial sectional view taken along line 5—5 of FIG. 2.

A pair of threaded members or set screws 54 and 56 are threadedly mounted in internally threaded bores 58 and 60 respectively, located in the die plate 16. The screws 54 and 56 are provided with shank portions 62 and 64 respectively, which project into the chamber 20 and abut against the mandrel proximate its projecting end. As noted in FIG. 2, the bores are formed in the die plate 16 so that the screws 54 and 56 project into the first cylindrical bore 22, rather than into the conical portion 30, or the third cylindrical bore 28. This relative positioning of the screws prevents distortion to the extruded product which might be caused if the screws were too close to the extrusion orifice. As depicted in FIG. 5, both of the screws 54 and 56 are positioned on the same side of the mandrel, and they are spaced apart and positioned with respect to each other so that one is above the other. As noted in FIG. 2 they both contact the mandrel at substantially the same axial distance from the end of the stem 42.

By adjusting one or both of the screws 54 or 56, movement is imparted to the projecting end of the mandrel, thus causing the stem to deflect slightly and the configuration of the annular passage to be changed. In other words, by adjusting screw 54, the stem 42 can be caused to move in the direction as shown by arrow c; by adjusting screw 56 on the other hand, the stem can be caused to move in the direction of arrow a; and by adjusting both screws by the same amount, the stem can be caused to move in the direction as shown by arrow b. In this regard it should be realized of course that the stem can be caused to move in the opposite directions relative to that designated by a, b or c, by rotating the screws in an opposite direction, because by so doing, the end piece is caused to move toward its original eccentric position.

Figure 6:
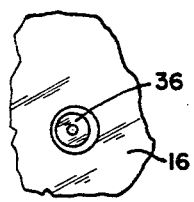
FIG. 6 is a partial end view showing a first position of the mandrel within an extrusion orifice.
Figure 7:
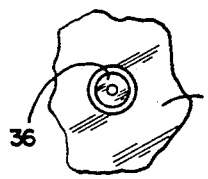
FIG. 7 is a partial end view similar to FIG. 6, but showing a second position of the mandrel within the extrusion orifice.

It should be noted that when the mandrel 36 is positioned within the chamber 20, the stem projects toward the cylindrical bore 28 so that the end piece 44 is eccentrically positioned within the orifice, note FIG. 6. By adjusting one or both screws 54 or 56, the end of the mandrel can be laterally moved so that the end piece is concentrically positioned within the orifice, note FIG. 7. By positioning the mandrel 36 within the chamber so that its projecting end is normally eccentrically positioned within the orifice, the adjusting screws need only be provided on one side because axial movement of the screws causes the stem to move either toward the right or toward the left. In other words, in order to move the mandrel to the right as viewed in FIGS. 6 and 7, the adjustment required is in a positive direction and it is achieved by pushing rather than by pulling the mandrel toward the right as viewed in FIG. 2. This feature is extremely important in extrusion equipment similar to that shown for example in FIG. 1, for as shown in this figure, it would be quite difficult to position a number of adjusting screws around the mandrel, in the manner taught by the prior art.

In operation, it has been found that this invention is particularly useful in forming ready-to-eat food products which are formed in tubular shapes. Ingredients which form such products are mixed and cooked to form a gelatinized cereal dough which is then extruded to form a product having the desired shape and size. In general, doughs derived from wheat, corn, oats, rye, or the like, as well as mixtures of these cereal grains, can be used and cooked to the desired degree of gelatinization in any conventional manner. Additional steps such as cutting, puffing, drying, and the like, are thereafter performed to complete the process. Since this invention concerns the extrusion apparatus, the other equipment used in the processing operation will not be described in detail.

As illustrated in FIG. 2, the cereal dough is forced through the extrusion apparatus 10, and more particularly the chamber 20 and extrusion orifice by the piston 34, which is caused to move downwardly as viewed in FIG. 2. It must be understood of course, that the piston 34 is merely illustrative of one type of device which might be used for forcing the cereal dough through the apparatus, and it is envisioned that other types of devices could readily be used for this purpose as well. As the dough is forced through the apparatus, it passes through the bore 22, through the tapering passage 30, and into the passage formed within the bore 28, i.e., the annular passage formed by the mandrel 36 and the bore 28. As the dough is discharged through the orifice, it emerges in a tubular shape. The cutter 70 slices the tube into products of desired length. During the extrusion operation, air is fed through the passages 52, 48, and 46, and discharged inside the extruded tube. This aids in the proper formation of the extruded tube of dough, probably by providing interior support for the tube and also cooling the inner surface of the same.

During the extrusion operation it may be observed or detected that the tubular product is being formed having a wall thickness which is uneven and non-uniform. By adjusting one or both of the screws 54 and/or 56 in the manner described above, the projecting end of the mandrel 36 can be deflected by causing it to move by a slight amount, so that the end piece 24 is more concentrically positioned within the orifice.

Figure 8:
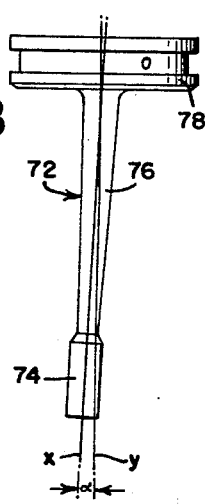
FIG. 8 illustrates a modification of a die mandrel similar to the mandrel shown in FIG. 3.

FIGURE 8 illustrates a modification of the mandrel. In this embodiment, the mandrel 72 is formed so that the end piece 74 is concentric with respect to the stem 76. Note however that the stem 76 is attached to the ring member 78 in such a manner that its longitudinal axis, designated x, does not coincide with an axis perpendicular to the ring member, designated y. In other words, an angle α is defined by the axes x and y. In all other respects, the embodiment is substantially the same as the embodiment shown in FIG. 3, and the operation of an apparatus using this mandrel is the same as that described before.

Figure 9:
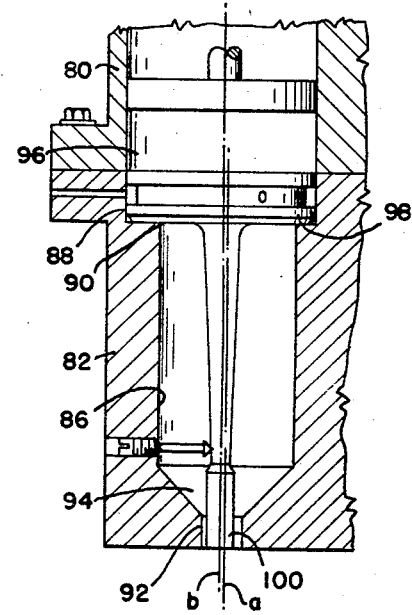
FIG. 9 is an elevational sectional view illustrating another embodiment of the invention.

FIGURE 9 illustrates still another embodiment of the invention. This embodiment is quite similar to that shown in FIG. 2 in that it includes a first die plate 80 and a second die plate 82. The second die plate 82 includes a first cylindrical bore 86 which has a centerline designated a; a second cylindrical bore 88 which has a centerline designated b and which forms a shoulder 90 with the bore 86; a third cylindrical bore 92 which defines an extrusion orifice and which has a centerline which coincides with centerline a; and a frusto-conical portion 94 which connects the bores 86 and 92 together. Note that the diameter of the second bore 88 is larger than the diameter of the first bore 86, and that the diameter of the first bore 86 is larger than the diameter of the third bore 92. The die plate 80 has a bore 96 which is the same size as the bore 88 and it is aligned with it. A mandrel 98, similar to mandrel 36 except that its end piece 100 is concentrically positioned on the stem, is positioned within the die plate 82 in such a manner that it abuts against the shoulder 90, and its projecting end is positioned within the orifice 92. Set screws similar to that described before, are positioned within the lower portion of the die plate 82.

As noted, the bores 86 and 88 are eccentric relative to each other, and their respective centerlines *a* and *b* are spaced apart from each other by a slight amount. This feature permits the mandrel 98 to be uniformly formed, without any eccentric portions. Thus, the end piece 100 is eccentrically positioned within the orifice by positioning it within the bore 88 so that it abuts against the shoulder 90, and its relative position can be changed by the set screws in the same manner described above.

The operation of this embodiment is substantially the same as that described in connection with FIG. 2; therefore, its operation will not be described in detail.

In the above description and attached drawings, a disclosure of the principles of this invention is presented, together with some of the embodiments by which the invention may be carried out.

Now therefore, we claim:

1. An extrusion apparatus for forming tubular products comprising the combination of a die chamber having an extrusion orifice, a mandrel within the die chamber, means for fixedly supporting said mandrel within the die chamber so that one of its ends projects into the orifice thereby forming an annular passage, the projecting end of said mandrel being eccentrically positioned within the orifice, and means for laterally adjusting the projecting end of said mandrel so that said end can be concentrically positioned within the orifice.

2. The combination of claim 1 wherein the adjusting means includes at least one threaded member mounted within the apparatus in such a manner that it abuts against a portion of the projecting end of the mandrel, adjustment of said one threaded member imparting lateral movement to the projecting end of the mandrel relative to the extrusion orifice, thereby causing the eccentrically positioned mandrel to be concentrically positioned within the orifice.

3. The combination of claim 1 wherein the mandrel includes a ring member, an elongate stem member, means for attaching the stem to the ring member, and an end piece which forms a part of said stem member, said end piece being eccentrically positioned with respect to the longitudinal axis of the stem member.

4. The combination of claim 3 wherein a plurality of spokes are provided for attaching the stem to the ring member, the ring member is provided with a peripheral groove, the stem is provided with a longitudinal tubular passage, and at least one of the spokes is provided with a tubular passage which connects the stem passage with the peripheral groove whereby air can be discharged through the projecting end of the mandrel.

5. The combination of claim 1 wherein the mandrel includes a ring member, an elongate stem member, and means for attaching the stem member to the ring member in such a manner that the longitudinal axis of said member defines an angle with respect to an axis perpendicular to the ring member.

6. An extrusion apparatus for forming tubular products comprising the combination of a die chamber having an extrusion orifice, a mandrel within the die chamber, means for supporting said mandrel within the die chamber so that one of its ends projects into the orifice thereby forming an annular passage, the projecting end of said mandrel being eccentrically positioned within the orifice, and means for laterally adjusting the projecting end of said mandrel so that said end can be concentrically positioned within the orifice, said adjusting means including a pair of threaded members which abut against a portion of the mandrel proximate its projecting end, said threaded members being positioned on substantially the same side of the mandrel and being spaced apart with respect to each other so that they frictionally contact said mandrel at a point substantially the same axial distance from the projecting end of said mandrel, relative adjustment of either of said threaded members imparting lateral movement to the projecting end of the mandrel in opposite directions relative to the extrusion orifice, simultaneous adjustment of said members imparting lateral movement to the mandrel in a different direction.

7. The combination of claim 6 wherein the die chamber includes a first cylindrical bore, a second cylindrical bore which defines the extrusion orifice and which is smaller in cross-sectional area than the first bore, and a transition portion which connects the first and second bores together, the threaded members being positioned so that they project into the first cylindrical bore.

8. The combination of claim 7 wherein the mandrel includes a stem member and an end piece which forms a part of said stem member, the threaded members abutting against the stem member at a point adjacent to the end piece.

9. The combination of claim 1 wherein the die chamber includes a number of cylindrical bores including a first cylindrical bore and a second cylindrical bore which has a larger diameter than said first bore and which forms a shoulder with said first bore, said second bore being eccentrically positioned with respect to the first bore so that their respective centerlines do not coincide.

References Cited

UNITED STATES PATENTS

| | | | |
|---|---|---|---|
| 751,108 | 2/1904 | Royle | 18—14 |
| 2,683,896 | 7/1954 | Patterson | 18—12 |
| 3,241,346 | 3/1966 | Doss | 18—14 X |

WALTER A. SCHEEL, *Primary Examiner.*

J. SHEA, *Assistant Examiner.*